(12) United States Patent
Toufik et al.

(10) Patent No.: US 8,995,296 B2
(45) Date of Patent: Mar. 31, 2015

(54) METHOD FOR COMPUTING THE RECEIVE POWER OF A NON SERVING CELL, AND RECEIVER FOR DOING THE SAME

(75) Inventors: Issam Toufik, Juan les Pins (FR); Fabrizio Tomatis, Saint Laurent du Var (FR)

(73) Assignee: St-Ericsson SA, Plan-les-Ouates (CH)

( * ) Notice: Subject to any disclaimer, the term of this patent is extended or adjusted under 35 U.S.C. 154(b) by 448 days.

(21) Appl. No.: 13/518,441

(22) PCT Filed: Dec. 29, 2010

(86) PCT No.: PCT/EP2010/007957
§ 371 (c)(1),
(2), (4) Date: Sep. 2, 2012

(87) PCT Pub. No.: WO2011/079945
PCT Pub. Date: Jul. 7, 2011

(65) Prior Publication Data
US 2012/0320773 A1    Dec. 20, 2012

(30) Foreign Application Priority Data

Dec. 30, 2009    (EP) .................................... 09368053

(51) Int. Cl.
*G01R 31/08*    (2006.01)
*H04B 17/00*    (2006.01)

(52) U.S. Cl.
CPC .................................. *H04B 17/0077* (2013.01)
USPC ......................................... 370/252; 370/328

(58) Field of Classification Search
CPC ............. H04B 17/0045; H04B 17/006; H04L 5/0007; H04L 25/0204; H04W 24/10
See application file for complete search history.

(56) References Cited

U.S. PATENT DOCUMENTS

2009/0318090 A1 * 12/2009 Flordelis et al. ........... 455/67.13
2012/0250558 A1 * 10/2012 Chung et al. ................. 370/252

FOREIGN PATENT DOCUMENTS

EP          2 083 524 A1    7/2009
WO      2007/062933 A1    6/2007

OTHER PUBLICATIONS

Ericsson: "RSRP Measurement Accuracy", 3GPP Draft, R4-070408, 3rd Generation Partnership Project (3GPP), Mobile Compentence Centre; 650, Route Des Lucioles; F-06921 Sophia-Antipolis Cedex; France, vol. RAN WG4, Apr. 2, 2007, XP050176898, entire document (Continued)

*Primary Examiner* — Jung Park
(74) *Attorney, Agent, or Firm* — Patent Portfolio Builders PLLC

(57) ABSTRACT

A method for testing a band allocated to a non serving cell for a wireless OFDM communication systems, involving the step of:—configuring the RF front end circuit to receive a wide band signal covering multiple candidates of bandwidths (BW1) which are likely to be allocated to said non serving cell;—computing the received OFDM symbols;—entering into a first loop for successively testing two consecutive bandwidth candidates (BWj), said testing comprising the steps of:—computing a first non coherent power estimation (RSRP_Excessi) of the received signal on the basis of the reference signals (RS) existing in the non overlapping range of said two consecutive bandwidth (BWi);—computing a second coherent power estimation (RSRP_ExcesSj_coh)of the received signal on the basis of the reference signals (RS) existing in the non overlapping range of said two consecutive bandwidth (BWi);—comparing said first and said second estimation and determining and determining whether the tested bandwidth (BWi) is allocated to said tested non serving cell.

14 Claims, 4 Drawing Sheets

(56) References Cited

OTHER PUBLICATIONS

Nokia: "UE RSRP Measurment Accuracy", 3GPP Draft; R4-070611, 3rd Generation Partnership Project (3GPP), Mobile Competence Centre; 650, Route Des Lucioles; F-06921 Sophia-Antipolis Cedex; France vol. RAN WG4, No. Kobe, Japan; May 2, 2007, XP050177087, entire document.

Ericsson: "Reference Signal Received Quality, RSRQ Measurement", [online], No. R1-073041, pp. 1-2, XP002490044, Retrieved from the Internet: URL:http//www.3GPP.org/ftp/tsg%5Fran/WG1%5FRL1/TSGR1%5F49b/Docs/R1-073041.z >[retrieved on Jul. 29, 2008], entire document.

International Search Report issued in corresponding International application No. PCT/EP2010/007957, mailing date Apr. 26, 2011.

Written Opinion of the International Searching Authority issued in corresponding International application No. PCT/EP2010/007957, mailing date Apr. 26, 2011.

International Preliminary Report on Patentability issued in corresponding International application No. PCT/EP2010/007957, date of issuance: Jul. 4, 2012.

* cited by examiner

METHOD FOR COMPUTING THE RECEIVE POWER OF A NON SERVING CELL, AND RECEIVER FOR DOING THE SAME

TECHNICAL FIELD

The invention relates to the field of wireless communication and more particularly to a method for computing the receive power of a non serving cell for a OFDM wireless communication network, and a receiver for doing the same.

BACKGROUND ART

In cellular networks, when it moves from cells to cells and performs cell selection and handover, a mobile is assumed to measure the signal strength of the neighboring cells. Consequently, the mobiles continuously measure the receive power from the serving cell and candidate cells being in vicinity of the mobile and possible handover candidates.

In Long Term Evolution network, a User Equipment (UE) has to measure the RSRP (Reference Signal Received Power) of the neighboring non serving cells.

It is highly desirable that such RSRP be performed with appropriate accuracy, what closely depends upon the number of Reference Signals being considered. In the 3GPP standard specification 36.133 it is required as minimum requirement, to report the RSRP measured on the central 72 sub-carriers, what only results in a limited accuracy in the computing of the RSRP of the neighboring cells.

The only possibility known to increase the accuracy of the RSRP measurement is based on the increase of the <<time window>> of the measurement so as to increase the number of Reference Signals available from the central 72 sub-carriers bandwidth.

Such known solution is clearly time and power consuming since multiple frames are to be processed before leading to an accurate estimation of the RSRP.

Therefore, there is a desire for an alternative faster method which allows an more accurate determination of the RSRP of the neighboring non serving cells, and particularly without requiring the need to decode the P-BCH channel.

SUMMARY OF THE INVENTION

It is an object of the present invention to provide a process for detecting the band allocated to the non serving cells in a UMTS-LTE communication system.

It is a further object of the present invention to provide a process for improving the RSRP (Reference Signal Received Power) measurement accuracy of neighboring cells and then for preparing the Inter-Frequency and Intra-Frequency HandOver (HO).

It is still another object of the present invention to provide a process which achieves an accurate estimation of the power (RSRP) of the non serving cells without requiring the decoding of the P-BCH channel.

It is another object of the present invention to provide a process which achieves an accurate estimation of the RSRP of the non serving cell with limited power consumption.

It is still a further object of the present invention to achieve a process and an apparatus for performing the same for the purpose of simultaneously determining the band allocated to a neighboring non serving cell and the RSRP associated to that non serving cell.

These and other objects of the invention are achieved by means of a method for testing a band allocated to a non serving cell for a wireless OFDM communication systems, involving the step of:

configuring the RF front end circuit to receive a wide band signal covering multiple candidates of bandwidths ($BW_i$) which are likely to be allocated to said non serving cell;

computing the received OFDM symbols;

entering into a first loop for successively testing two consecutive bandwidth candidates ($BW_i$;), said testing comprising the steps of:

computing a first non coherent power estimation (RSRP_Excess$_i$) of the received signal on the basis of the reference signals (RS) existing in the non overlapping range of said two consecutive bandwidth (BWi);

computing a second coherent power estimation (RSRP_Excess$_i$_coh)of the received signal on the basis of the reference signals (RS) existing in the non overlapping range of said two consecutive bandwidth (BWi);

comparing said first and said second estimation and determining whether the tested bandwidth (BWi) is allocated to said tested non serving cell.

In one embodiment the method comprises a first loop for testing two consecutive bandwidths, starting from the larger bandwidth, which loop involves the following steps:

computing a first Reference Signal Receive Power (RSRP) (RSRP_Excess$_i$) which is based on the reference signals (RS) measured on the resources blocks located in a non overlapping range of frequencies between said two consecutive bandwidths ($BW_i$)

computing a second coherent Reference Signal Receive Power (RSRP) (RSRP_Excess$_i$_coh) which is based on said reference signals (RS) measured on the resource blocks located in a non overlapping range of frequencies between said two consecutive bandwidths (BWi) after derotation with the Pseudo Noise (PN) sequence used for the non serving cell being tested;

comparing said first (RSRP_Excess$_i$) and second RSRP ((RSRP_ExcessK_coh) and deriving from said comparison an information as to whether the tested bandwidth (BWi) is allocated to said tested non serving cell.

In one embodiment, the method further involves the step of determining that the tested bandwidth $BW_i$ is allocated to said non serving cell if said first RSRP (RSRP_Excess$_i$) is inferior than said second RSRP (RSRP_Excess$_i$_coh) plus one given threshold.

Preferably, the first loop is initialized with the larger bandwith which coincides with the bandwidth allocated to the serving cell.

In one embodiment, the method involves a second loop for successively checking the following formula If RSRP_Excess$_i$>Alfa*RSRP_central In two consecutive bandwidth (BWi) , starting from a central bandwidth, and stopping said loop when the condition is false.

The invention also achieves a receiver for a OFDM wireless communication network which includes means for computing the receive power of the non serving cells, characterized in that it comprises:

means for configuring the RF front end circuit to receive a wide band signal covering multiple candidates of bandwidths ($BW_i$) which are likely to be allocated to said non serving cell;

means for computing the received OFDM symbols;

means for computing a first loop for successively testing two consecutive bandwidth candidates ($BW_i$), said computing means comprising:

means for computing a first non coherent power estimation (RSRP_Excess$_i$) of the received signal on the basis of the reference signals (RS) existing in the non overlapping range of two consecutive bandwidths (BWi);

means for computing a second coherent power estimation (RSRP_Excess$_i$_coh) of the received signal on the basis of the reference signals (RS) existing in the non overlapping range of two consecutive bandwidths (BWi);

means for comparing said first and said second estimation and determining and determining whether the tested bandwidth (BWi) is allocated to the tested non serving cell.

In one embodiment, the computation of the first (non coherent) RSRP is based on the reference signals (RS) measured on the resources blocks located in a non overlapping range of frequencies between two consecutive bandwidths (BW$_i$). The computation of the second coherent RSRP is based on said reference signals (RS) measured on the resource blocks located in a non overlapping range of frequencies between said two consecutive bandwidths (BWi) after derotation with the Pseudo Noise (PN) sequence used for the non serving cell being tested.

The receiver further comprises means for comparing the two non coherent and coherent power measurement (RSRP_Excess$_i$, RSRP_ExcessK_coh) and for deriving from said comparison an information as to whether the tested bandwidth (BWi) is allocated to said tested non serving cell.

Practically, in one embodiment, there is determined whether the first non coherent RSRP (RSRP_Excess$_i$) is inferior than the second coherent RSRP (RSRP_Excess$_i$_coh) plus one given Threshold.

In one embodiment, the receiver includes means for performing a second loop which checks the following relation:

If RSRP_Excess$_i$>Alfa*RSRP_central

In two consecutive bandwidth (BWi), starting from a central bandwidth. So as to confirm that the excess bandwidth which is tested comprises signal allocated to the non serving cell.

DESCRIPTION OF THE DRAWINGS

Other features of one or more embodiments of the invention will best be understood by reference to the following detailed description when read in conjunction with the accompanying drawings.

DESCRIPTION OF THE PREFERRED EMBODIMENT

It will now be described with details how one can perform faster and more accurate determination of the received power of a non serving cell in the case of a an OFDM wireless communication system.

The method which will be described hereinafter with details is particularly suitable for the LTE (Long Term Evolution) wireless communication system defined by the 3GPP standardization committee. However, a skilled man may clearly adapt the teaching of the invention to other OFDM based systems.

The physical channels structure for LTE is presented in the 3GPP specification 36.211 in the frequency and time domain. Taking as assumption the physical channels structure, the UE (User Equipment), should be able to continuously monitor the RSRP of targeted cells.

Figure 1:
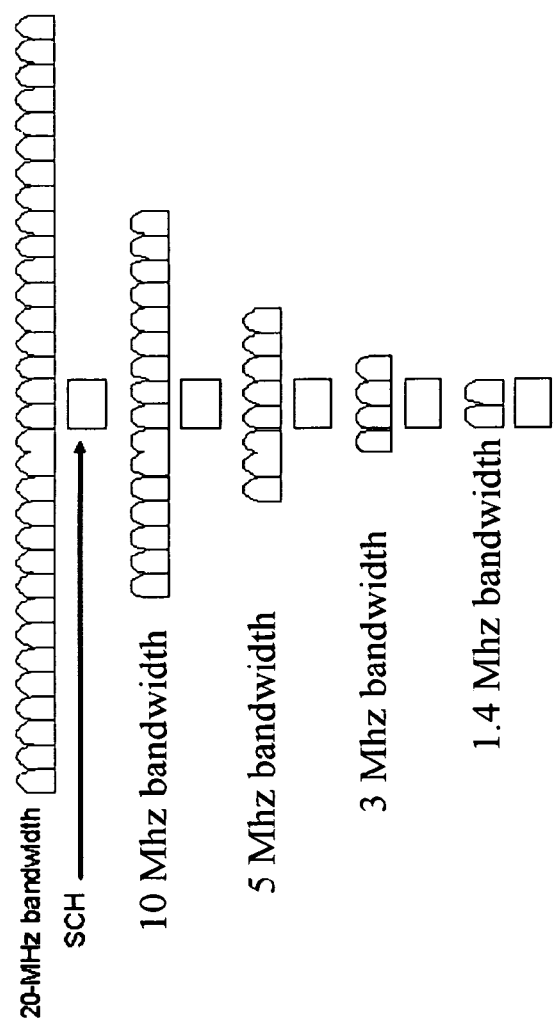
FIG. 1 illustrates the allocation of different bandwidth BW in the down-link communication in a LTE communication system.

In LTE, the operators can allocate different BWs (Band Width) in the DL (Down Link) depending on their frequency plan needs. In an illustrative not limiting example, the allowed band width BWs can be 1.4 MHz, 3 MHz, 5 MHz, 10 MHz, 15 MHz, 20 MHz, as illustrated in FIG. 1. This information is communicated by the e-UTRAN to the UE via the P-BCH. In case of the neighbour cells, as mentioned in the first part of this description, the UE is not required by the standardization protocols to decode the PBCH as part of the measurement and reporting procedure and is thus not aware of the bandwidth allocated to the non serving cells.

Figure 2:
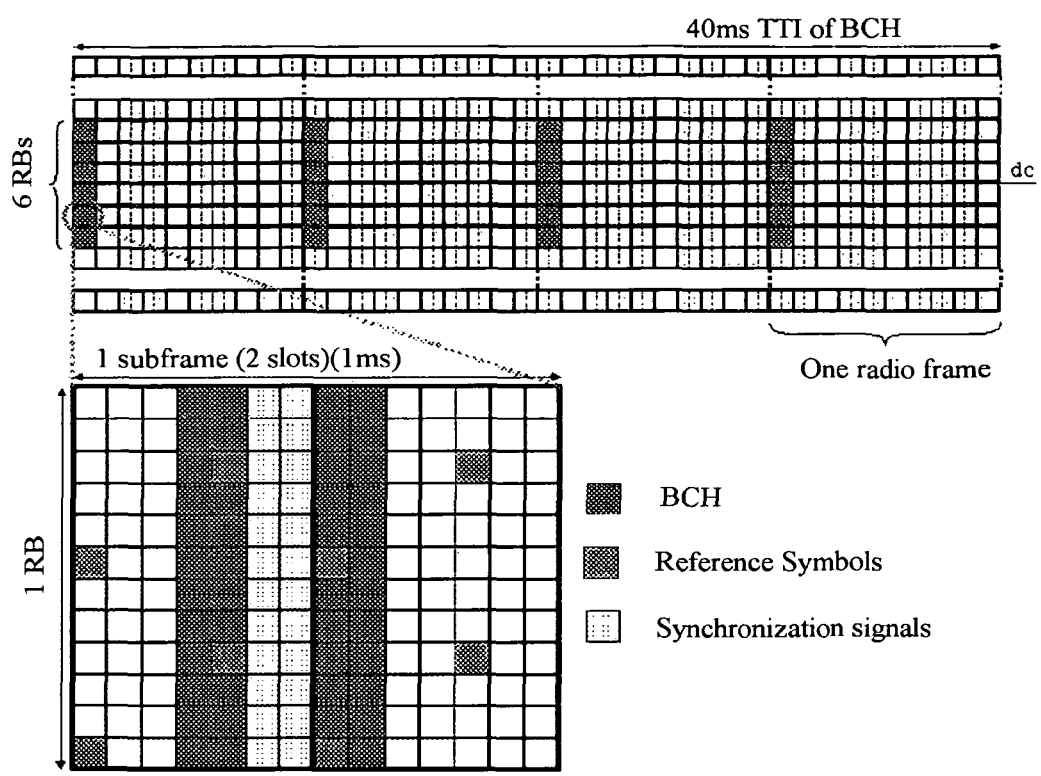
FIG. 2 illustrates the distribution of the different reference and synchronization signals in the LTE frame and subframes.

While all the synchronization channels (PSCH, SSCH, PBCH) are transmitted on the central 72 sub-carriers mapped on the minimum available bandwidth equal to 1.4 MHz BW, it should be noticed that the Reference signals are transmitted over the entire allocated BW as illustrated in FIG. 2.

It has been discovered by the inventors that one may take advantage of all the reference signals distributed in the whole OFDM frame, and thus significantly in order to increase the accuracy of the RSRP computation.

To achieve such accuracy, the method which is described below with details consists on first estimating the total allocated BW in the DL discriminating between adjacent interference and useful signal (thanks to RS orthogonality properties) and then second to use all the available RS symbols in such BW to improve the RSRP measurement accuracy.

For that purpose, the method successively tests two consecutive bandwidth candidates (BW$_i$) which can be used by the non serving cell, by means of two distinctive power computation:

a first non coherent power estimation (RSRP_Excess$_i$) of the received signal on the basis of the reference signals (RS) existing in the non overlapping range of said two consecutive bandwidths;

a second coherent power estimation (RSRP_Excess$_i$_coh) of the received signal on the basis of the reference signals (RS) existing in the non overlapping range of said two consecutive bandwidth (BWi);

Then, by comparing those two estimations for successive couples of consecutive bandwidths, one may validate the detection of power performed on the particular excess bandwidth as corresponding to the particular non serving cell, and thus confirm the particular bandwidth which is allocated to the non serving cell.

With respect to FIGS. 3 and 4, there will now be described one embodiment of a process which allows the determination of the RSRP of the non serving cells without preliminarily requiring the knowledge of the bandwidth allocated to one non serving cell.

Considering, as a general assumption, the case of an increase sequence or series of bandwidths BW$_i$ (with i=0 to K), with BM) being one central bandwidth being common to all BW$_i$ (for i=1 to K).

With respect to the non limiting illustrative example of FIG. 1, one sees that the following sequences of band widths BW are considered:

$BW_0$=1.4 MHz,
$BW_1$=3 MHz,
$BW_2$=5 MHz,
$BW_3$=10 MHz,
$BW_4$=15 MHz,
$BW_5$=20 MHz

When a User Equipment detects the presence of a non serving cells, all those BW are possible candidates for the actual bandwidth to be used in the downlink.

Figure 3:
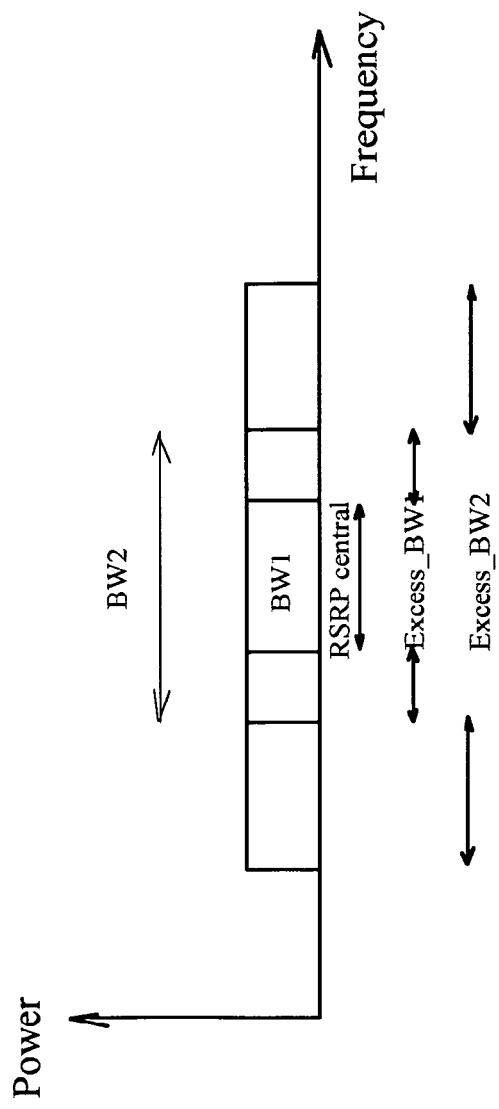
FIG. 3 illustrates a power-frequency diagram representing different possible BW candidates.

Let us define the concept of a so-called Excess bandwidth $Excess\_BW_i$ which is to be understood as difference between 2 consecutives BWs values, or more precisely the non overlapping frequency range between two consecutive bandwidths as illustrated in FIG. 3:

$Excess\_BW_i$=non overlapping range of $(BW_i, BW_{i-1})$.

Therefore, in the practical example of FIG. 1, the $Excess\_BW_i$ corresponds to the non overlapping range between the 1.4 Mhz and the 3 Mhz bands, the $Excess\_BW_2$ corresponds to the non overlapping range between 3 Mhz and 5 Mhz, etc . . .

In accordance with 3GPP requirement, the RSRP is conventionally computed on the Reference Signals which are included in the central bandwidth BW1 (1.4 Mhz). As known by the skilled man, such conventional computation is achieved by a set of measurements performed on the Resource Blocks (RB) in the frequency domain and over a sequence of N slots, where N can be reduced to 1 in case of Inter-frequency HO to gain on power consumption.

The practical way to derive the RSRP from the use of the RB of the central bandwidth is well known to a skilled man and will therefore be not further details.

Let us define "RSRP_centre" to be this conventional measurement.

In accordance with the process which will be described now with details, there is performed an additional set of measurements in order to validate of not the set of possible candidates $BW_i$ which can be used for performing an accurate RSRP measurement.

Let us define $RSRP\_Excess_i$ to be the average RSRP which can be computed, in accordance with the conventional measurement methods, from the reference signals located in the so-called excess bandwidth $Excess\_BW_i$, over a period of N slots.

As a consequence, with the definition which was introduced above, $RSRP\_Excess_1$ is the RSRP which can be measured on the excess bandwidth from 1.4 to 3 Mhz (non overlapping range between $BW_0$=1.4 Mhz and $BW_1$=3 Mhz), $RSRP\_Excess_2$ is the RSRP which can be measured on the excess bandwidth 3 to 5 Mhz (non overlapping range between $BW_1$=3 Mhz and $BW_2$=5 Mhz), . . . , $RSRP\_Excess_5$ for the BW from 15 to 20 Mhz as shown in FIG. 3.

Let us now define the RSRP_coh as being the measurement of the power of the average of the of the RS over 1 or more RBs (RS coherent sum after derotation by the PN sequence using for scrambling the RS) and then non-coherently summed over the remaining RBs to fit with the corresponding BW. Such a coherent average, taking advantage of the PN sequence which multiplies the RS symbols, allows discriminating noise (adjacent interfering signal) from useful signal.

Therefore, instead of simply computing a RSRP value, in accordance with the conventional "RSRP central measurement", the reference signals RS which are detected in the resources blocks are first derotated by the expected PN sequence corresponding to the non serving cell (serving as a reference). The result is then averaged on the whole set of resources signals RS existing in whole frame (corresponding to $BW_K$), and then the RSRP can be computed.

The coherent power is computed as described above on both the central bandwidth ($BW_0$) and the Excess bandwidth (Excess_BWi), leading to the following parameters:

RSRP_central_coh which is computed on the central bandwidth $BW_1$, and $RSRP\_Excess_i\_coh$ which are computed for each excess Bandwidth $Excess\_{BWi}$.

Figure 4:
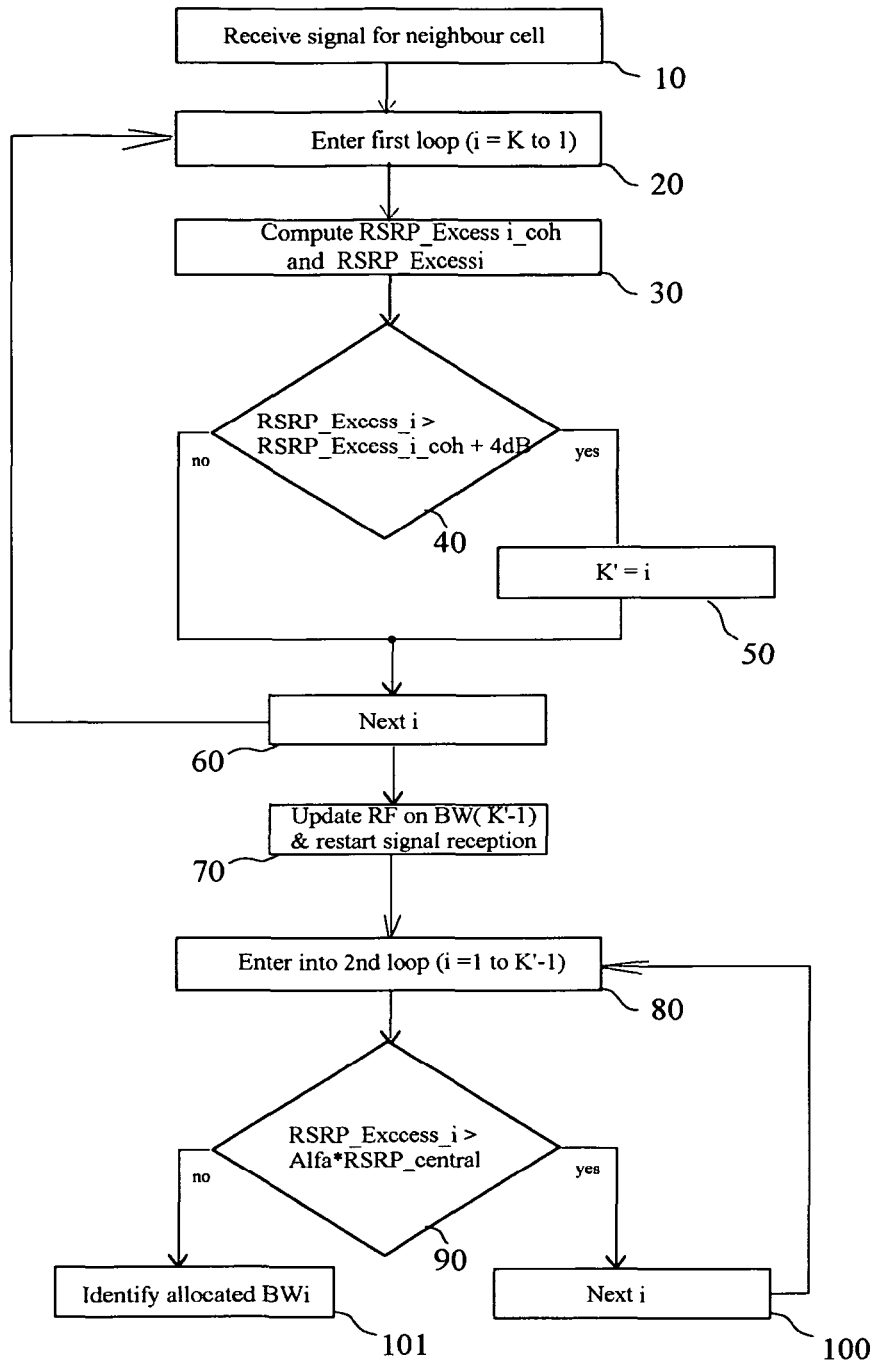
FIG. 4 illustrates one embodiment of a process for determining the bandwidth of a non serving cell in accordance with the present invention.

With respect FIG. 4, there is now described one embodiment of the process which achieves fast computation of the RSRP of a non serving cell.

In a step 10, the process receives a signal from a neighboring cell to be tested which is a NON serving cell. For that purpose, it should be noticed that the RF module is set so as to allow reception by the RF front end of the full bandwidth which is set of correspond to the larger bandwidth $BW_K$, namely 20 Mhz in our example.

Preferably, the full bandwidth is set to correspond to the bandwidth of the serving cells since , in most cases, a non serving cell would be allocated the same bandwidth than the bandwidth allocated to a serving cell. This is particularly relevant for the case of the intrafrequency non serving cell measurement.

The reception of the RF signal, and its processing by the different blocks and module within the receiver complies with the conventional way and will not be further described since it is well known to a skilled man. It suffices to remind that, in a OFDM system, a Fast Fourrier Transform is applied, after synchronization, so as to provide the radio frames comprising the different resources blocks represented in FIG. 2.

Clearly, since the FFT was applied on the full band signal, a full matrix is available which covers all possible BW candidates.

In a step 20, the process enters, after the initialization of a parameter K'=K, in a loop where it successively processes the consecutive excess bandwidths $Excess\_BW_i$ with i=K to 1, starting from the larger bandwidth $BW_K$ In a step 30, the process proceeds with the computation of the values of $RSRP\_Excess_i\_coh$ and with $RSRP\_Excess_i$. In the first loop, the larger bandwidth is being processed, what leads to the computation of:

$RSRP\_Excess_5\_coh$ and, $RSRP\_Excess_5$

With the example shown in FIG. 1 , where i=5 , and assuming to have at least an average over 1 RB (i.e. 4 RS symbols).

Considering that in the excess BW there could be present either a useful signal or adjacent interfering signal, the process then discriminates both situations. To achieve this, the process proceeds with a step 40 where a test is performed in order to determine whether:

$RSRP\_Excess_i > RSRP\_Excess_i\_coh + Threshold$

In one particular embodiment, the threshold is set to correspond to a value of 4 dB. However, this is one example and the skilled man may use any other value in accordance with the particular application being considered.

If the test is false, then the process directly proceeds to a step 60.

If the test is true, then the process proceeds to a step 50 where the internal parameter K' is updated with the current value of index i:

K'=i

The process then proceeds to NEXT step 60, in order to consider the next value of i in the sequence of values K, K-1 . . . 1, and the process loops back to step 20.

At the end of the first loop, when all consecutive values of i have been tested—and correspondingly all the bandwidth in excess—parameter K' stores the last value of index i corresponding to a bandwidth where an adjacent interfering signal is assumed to have been detected in Excess_BWi Once the value of K' has been determined, the process then proceeds to a step 70 where the RF receiver—and particularly the Automatic Gain Control (AGC) therein located—is configured to receive the bandwidth $BW_{k'-1}$ corresponding to parameter K'-1 and the process restarts the signal reception with the BW detected to be free from adjacent interference.

The process then enters into a second loop in a step 80, (For i=1 to K'-1 with K' corresponding to the value returned by step 50 of the first loop) to detect on the remaining BW it is allocated a useful signal, starting from the bandwidth $(BW_0)$ and up to the last value of i processed during the first loop, and assumed to be equal to K'-1.

In a step 90, the process proceeds to a test in order to determined whether

If RSRP_Excess$_i$>Alfa*RSRP_central

If this is true, then the process proceeds to a step 100, where the next value of i is considered.

If the test of step 90, shows that RSRP_Excess$_i$<=Alfa*RSRP_central then the allocated BW is identified in a step 101 and it corresponds to the current value of i plus one. For example, if test of step 90 has shown that RSRP_Excess2<=Alfa*RSRP_central then the current bandwidth is identified to be $BW_3$).

Alfa is a programmable multiplying factor smaller than one. Alfa is function of the number of slots N used for averaging the RSCP measurement, the smaller N, the smaller Alfa should be considered. Alfa is also function of the fading profile and it is then considered programmable in function of a channel impulse response duration estimator. As a general statement Alfa is programmable in function of the RSRP_Excess$_i$ measurement expected accuracy.

As final step we take all the RSRP_Excess$_i$ satisfying the IF condition, average them with the RSRP_central and report to the e-UTRAN the average as the RSRP estimate for the targeted cell.

This improved method will then result in a power consumption reduction thanks to the reduction of the number of measurements occasions required (especially in case of Interfrequency measurement) and to an improved RSRP is measurement accuracy (including a reduction of the multi-cell interfering RS) allowing a more proper hand-over mechanism and then a reduced number of drop calls (especially in case of Intra-frequency handover).

It can be seen that the process of the invention achieves an alternative way to determine the band allocated to a non serving cells which does not require the decoding of the P-BCH channel which, as known by a skilled man, requires a significant amount of processing resources.

By detecting the total system bandwidth, more RS are available to perform the RSRP measurements. More RS implies a better accuracy and reduced latency. This method does not require any signaling information from the e-UTRAN, in particular this method does not require the PBCH decoding. All the necessary information required by the UE in order to apply such method are available thanks to the PSS and SSS decoding. PSS and SSS decoding are in any case required for synchronizing to the target cell.

In addition, the invention achieves very fast determination of the band—and thus the RSRP computing—since the latter can be estimated in only one frame while the decoding of the P-BCH would have required about 10 frames.

The invention claimed is:

1. Method for testing a band allocated to a non serving cell for a wireless OFDM communication systems and for computing the receive power of said non serving cells, involving the step of:
   configuring the RF front end circuit to receive a wide band signal covering multiple candidates of bandwidths ($BW_i$) which are likely to be allocated to said non serving cell;
   computing the received OFDM symbols;
   entering into a first loop for successively testing two consecutive bandwidth candidates ($BW_i$), said testing comprising the steps of:
   computing a first non coherent power estimation (RSRP_Excess$_i$) of the received signal on the basis of the reference signals (RS) existing in the non overlapping range of said two consecutive bandwidth (BWi);
   computing a second coherent power estimation (RSRP_Excess$_i$_coh) of the received signal on the basis of the reference signals (RS) existing in the non overlapping range of said two consecutive bandwidth (BWi); and
   comparing said first and said second estimation and determining and determining whether the tested bandwidth (BWi) is allocated to said tested non serving cell.

2. Method according to claim 1 wherein it further involves the step of:
   enter into a first loop in order to test two consecutive bandwidths, starting from the larger bandwidth, said first loop involving the following steps:
   computing a first Reference Signal Receive Power (RSRP) (RSRP_Excess$_i$) which is based on the reference signals (RS) measured on the resources blocks located in a non overlapping range of frequencies between said two consecutive bandwidths ($BW_i$);
   computing a second coherent Reference Signal Receive Power (RSRP) (RSRP_Excess$_i$_coh) which is based on said reference signals (RS) measured on the resource blocks located in a non overlapping range of frequencies between said two consecutive bandwidths (BWi) after derotation with the Pseudo Noise (PN) sequence used for the non serving cell being tested; and
   comparing said first (RSRP_Excess$_i$) and second RSRP ((RSRP_ExcessK_coh) and deriving from said comparison an information as to whether the tested bandwidth (BWi) is allocated to said tested non serving cell.

3. Method according to claim 1 wherein it further involves the step of determining that the tested bandwidth $BW_i$ is allocated to said non serving cell if said first RSRP (RSRP_Excess$_i$) is inferior than said second RSRP (RSRP_Excess$_i$_coh) plus one given Threshold.

4. Method according to claim 2 wherein the larger bandwidth which is considered in the first loop is set to coincide with the bandwidth allocated to the serving cell.

5. Method according to claim 2 wherein said threshold is set to be equal to 4 dB.

6. Method according to claim 2 wherein it further involves the step of:
   entering a second loop for successively checking the following formula If RSRP_Excess$_i$>Alfa*RSRP_central In two consecutive bandwidth (BWi), starting from a central bandwidth, and stopping said loop when the condition is false.

7. Method according to claim 1 wherein it is adapted to a User Equipment for a Long Term Evolution wireless communication network.

8. Receiver for a wireless OFDM communication system comprising basestation including a serving cell and non serving cells which can be possible candidate for a Hand-over, said receiver including:
  means for configuring the RF front end circuit to receive a wide band signal covering multiple candidates of bandwidths ($BW_i$) which are likely to be allocated to said non serving cell;
  means for computing the received OFDM symbols;
  means for computing a first loop for successively testing two consecutive bandwidth candidates ($BW_i$), said computing means comprising:
  means for computing a first non coherent power estimation ($RSRP\_Excess_i$) of the received signal on the basis of the reference signals (RS) existing in the non overlapping range of said two consecutive bandwidth (BWi);
  means for computing a second coherent power estimation ($RSRP\_Excess_i\_coh$) of the received signal on the basis of the reference signals (RS) existing in the non overlapping range of said two consecutive bandwidth (BWi);
  means for comparing said first and said second estimation and determining and determining whether the tested bandwidth (BWi) is allocated to said tested non serving cell.

9. Receiver according to claim 8 wherein the computation of said first Reference Signal Receive Power (RSRP) ($RSRP\_Excess_i$) is based on the reference signals (RS) measured on the resources blocks located in a non overlapping range of frequencies between said two consecutive bandwidths ($BW_i$) and wherein the computation of the second coherent Reference Signal Receive Power (RSRP) ($RSRP\_Excess_i\_coh$) which is based on said reference signals (RS) measured on the resource blocks located in a non overlapping range of frequencies between said two consecutive bandwidths (BWi) after derotation with the Pseudo Noise (PN) sequence used for the non serving cell being tested;
  And wherein it further comprises:
  means for comparing said first ($RSRP\_Excess_i$) and second RSRP (($RSRP\_ExcessK\_coh$) and deriving from said comparison an information as to whether the tested bandwidth (BWi) is allocated to said tested non serving cell.

10. Receiver according to claim 9 comprising means for determining that the tested bandwidth $BW_i$ is allocated to said non serving cell if said first RSRP ($RSRP\_Excess_i$) is inferior than said second RSRP ($RSRP\_Excess_i\_coh$) plus one given Threshold.

11. Receiver according to claim 9 wherein the larger bandwidth which is considered in the first loop is set to coincide with the bandwidth allocated to the serving cell.

12. Receiver according to claim 9 wherein said threshold is set to be equal to 4 dB.

13. Receiver according to claim 9 further comprising means for performing a second loop for successively checking the following formula If $RSRP\_Excess_i > Alfa*RSRP\_central$ In two consecutive bandwidth (BWi), starting from a central bandwidth.

14. User Equipment comprising a receiver as defined in claim 8.

* * * * *